L. ROSENKRANZ.
PEANUT ROASTER.
APPLICATION FILED SEPT. 26, 1910.
1,004,472.
Patented Sept. 26, 1911.
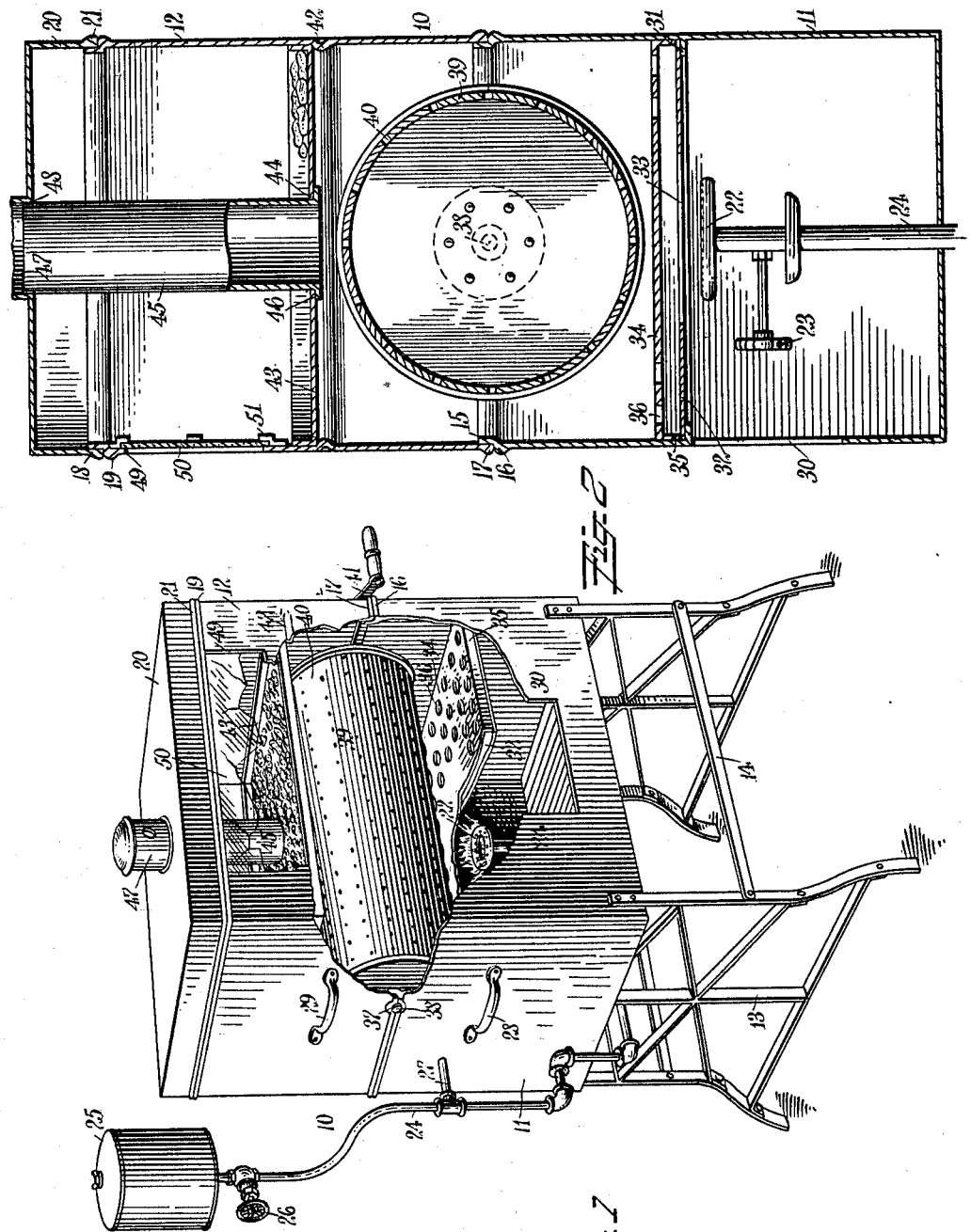
WITNESSES:
E. G. Bromley
John K. Brachvogel
INVENTOR
Louis Rosenkranz
BY
ATTORNEYS

UNITED STATES PATENT OFFICE.

LOUIS ROSENKRANZ, OF RHINEBECK, NEW YORK.

PEANUT-ROASTER.

1,004,472.　　Specification of Letters Patent.　Patented Sept. 26, 1911.

Application filed September 26, 1910. Serial No. 583,834.

*To all whom it may concern:*

Be it known that I, LOUIS ROSENKRANZ, a citizen of the United States, and a resident of the city of Rhinebeck, in the county of Dutchess and State of New York, have invented a new and Improved Peanut-Roaster, of which the following is a full, clear, and exact description.

This invention relates to roasters for peanuts and like products, and has reference more particularly to a device of this class, which comprises separable casing sections, a roaster removably mounted between the sections, and a burner under the roaster, the casing having a warmer therein above the roaster.

The object of the invention is to provide a simple and efficient roaster for peanuts and other like products, which is economical in operation, in which oil fuel can be used, in which there is little danger of burning the peanuts while roasting them, which requires comparatively little attention when in operation, and in which the nuts, after being roasted, can be kept warm, and ready for sale.

This invention consists in the construction, and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a perspective view of an embodiment of my invention, parts being broken away; and Fig. 2 is an enlarged vertical section of the casing of the roaster.

Before proceeding to a more detailed explanation of my invention, it should be understood that the present form of the device constitutes an improvement upon that shown in my United States Patent No. 309,098, December 9, 1884.

The roaster is constructed from sheet metal, and may be fashioned in different sizes. I prefer to employ for providing the necessary heat to roast the peanuts, a liquid fuel burner such as a gasolene burner. The burner may be of any suitable type. By employing a heating device of this character are obviated the disadvantages incident to the use of fuel such as charcoal. A burner of this kind also permits better regulation of the amount of heat desired. Certain of the details of construction shown for example herewith, form no part of the invention, and can be varied in accordance with individual preference and special conditions without departing from the underlying spirit of the invention.

Referring more particularly to the drawings, I provide a casing 10 consisting of a lower half or section 11, and an upper half or section 12. The lower section is mounted upon suitable supporting legs or frames 13, riveted or otherwise attached thereto, and connected by cross bars 14. The legs may be of any suitable kind, and as shown for example, can be fashioned from strips or metal riveted together. The lower casing section is open at the top and has an inwardly offset rim 15 and a body 16 extending around it. The lower open end of the upper casing section fits about the rim 15 and seats upon the body 16. It has extending around its lower edge, a similar body 17. The upper section 12 at the upper edge has an inwardly offset rim 18, and a body 19 formed to receive a cover or top 20, the edge of which is provided with a body 21, and is so provided that it fits about the rim 18 and seats at the body 19.

A burner 22 of any suitable kind is arranged within the lower casing section near the bottom thereof, and has a regulating valve 23. It communicates by means of a supply pipe 24, with a fuel reservoir 25, arranged at the outside of the casing. The pipe 24 has a regulating valve 26, and is secured to the casing by means of a support arm 27. The casing sections at the sides preferably has handles 28 and 29 to facilitate the manipulation of the roaster. At the front, the casing section 11 has an opening through which access can be had to the burner. Above the latter, the lower casing section has an inwardly disposed flange 31, and upon which is arranged a sheet or plate 32 constituting a bottom, and having above the burner an opening 33. A second partition or bottom 34 having a downwardly disposed rim 35, is mounted upon the first floor 32, and is spaced above the latter to the rim 35. It has perforations 36 therethrough around the opening 33 of the floor 32. These floors serve to disseminate the heat given off by the burner and distribute the heat evenly through the casing.

The casing sections at their adjacent edges are provided with bearings 37, in which are journaled the end spindles 38 of a cylindrical roaster 39, the wall of which is provided with perforations 40. The roaster is of any suitable type, and serves to hold the peanuts while they are being roasted. One of the spindles 38 has a handle crank 41 by means of which the cylinder can be turned.

Above the cylinder the upper casing section has an inwardly disposed rib 42 which carries a removable pan 43, upon which the peanuts when roasted and ready for sale can be kept. The pan has a central opening 44 through which extends a flue 45, having at the lower end a laterally disposed rim 46. The flue extends upwardly through the cover and into a chimney 47 mounted about an opening 48 of the cover. The upper casing section has an opening 49 in the front thereof, at which is positioned a sheet 50 of glass or other transparent material held in place by means of offset lugs 51, or in any other suitable manner. The glass or other transparent material permits the interior of the warmer in the casing above the pan to be viewed.

Having thus described my invention, I claim as new and desire to secure by Letters Patent:

1. A device of the class described, comprising a casing consisting of separable sections, a roaster rotatively and removably mounted between said sections, a burner under said roaster, spaced perforate partitions mounted between said burner and said roaster, a pan above said roaster, a removable cover upon said casing, and an open ended flue extended through said pan and said cover.

2. In a device of the class described, a casing, a burner therein, a roaster above said casing, a floor between said burner and said roaster and having an opening above said burner, and a second floor having a downwardly disposed flange resting upon said first floor whereby it is spaced from said first floor, said second floor having openings about said opening of said first floor.

3. In a device of the class described, a casing consisting of separable sections, a roasting cylinder journaled between said sections, a burner in the lower of said sections, separated perforate floors between said burner and said roaster, a pan in the upper of said sections above said cylinder, a flue extending upwardly through said pan, and a cover mounted upon the upper of said sections and having a chimney connecting with said flue.

In testimony whereof I have signed my name to this specification in the presence of two subscribing witnesses.

LOUIS ROSENKRANZ.

Witnesses:
CHAS. KELLEY,
WALTER W. SCHELL.

---

Copies of this patent may be obtained for five cents each, by addressing the "Commissioner of Patents, Washington, D. C."